(12) United States Patent
Brand et al.

(10) Patent No.: US 9,819,781 B1
(45) Date of Patent: Nov. 14, 2017

(54) SYSTEM FOR PROVIDING TEMPORARY SPEED RESTRICTIONS TO LOCOMOTIVES

(71) Applicant: New York Air Brake, LLC, Watertown, NY (US)

(72) Inventors: John Brand, Flower Mound, TX (US); Greg Hrebek, Flower Mound, TX (US); Wade Goforth, Carrollton, TX (US)

(73) Assignee: New York Air Brake, LLC, Watertown, NY (US)

( * ) Notice: Subject to any disclaimer, the term of this patent is extended or adjusted under 35 U.S.C. 154(b) by 0 days.

(21) Appl. No.: 15/151,615

(22) Filed: May 11, 2016

(51) Int. Cl.
 *H04M 1/725* (2006.01)
 *B61L 27/00* (2006.01)

(52) U.S. Cl.
 CPC ..... *H04M 1/72533* (2013.01); *B61L 27/0005* (2013.01); *B61L 27/0011* (2013.01); *B61L 27/0038* (2013.01)

(58) Field of Classification Search
 CPC ............ H04M 1/72533; B61L 27/0038; B61L 27/0011; B61L 27/0005; G10L 13/00; G10L 15/26; G10L 25/48; H04W 4/18
 See application file for complete search history.

(56) References Cited

U.S. PATENT DOCUMENTS

| 4,711,418 A * | 12/1987 | Aver, Jr. | B61L 27/04 246/187 B |
| 8,295,998 B2 | 10/2012 | Goodermuth et al. | |
| 9,513,630 B2 | 12/2016 | Rajendran et al. | |
| 2003/0097210 A1* | 5/2003 | Horst | B61C 17/12 701/19 |
| 2010/0039514 A1* | 2/2010 | Brand | B61L 3/127 348/148 |
| 2010/0235022 A1* | 9/2010 | Siddappa | B61C 17/12 701/20 |
| 2014/0180499 A1 | 6/2014 | Cooper et al. | |

FOREIGN PATENT DOCUMENTS

| EP | 1106469 | 6/2001 |
| WO | 2011149677 | 12/2011 |

OTHER PUBLICATIONS

International Search Report and Written Opinion Form PCT/ISA/220, International Application No. PCT/US2016/031801, p. 1-12, dated Jan. 17, 2017.

* cited by examiner

*Primary Examiner* — Daniel Lai
(74) *Attorney, Agent, or Firm* — Bond Schoeneck & King, PLLC; David Nocilly

(57) ABSTRACT

A system for automatically updating route information to a locomotive that includes a route computer and voice radio encoder that merges data representing temporary changes in a route with a voice radio call placed by a dispatcher to a locomotive engineer. A voice radio decoder coupled to the locomotive cab voice radio extracts the data representing the temporary changes from the voice radio signal and provides the data directed to the energy management system so that there is no need for the engineer to manually enter the temporary data.

13 Claims, 2 Drawing Sheets

SYSTEM FOR PROVIDING TEMPORARY SPEED RESTRICTIONS TO LOCOMOTIVES

BACKGROUND OF THE INVENTION

1. Field of the Invention

Figure 1:
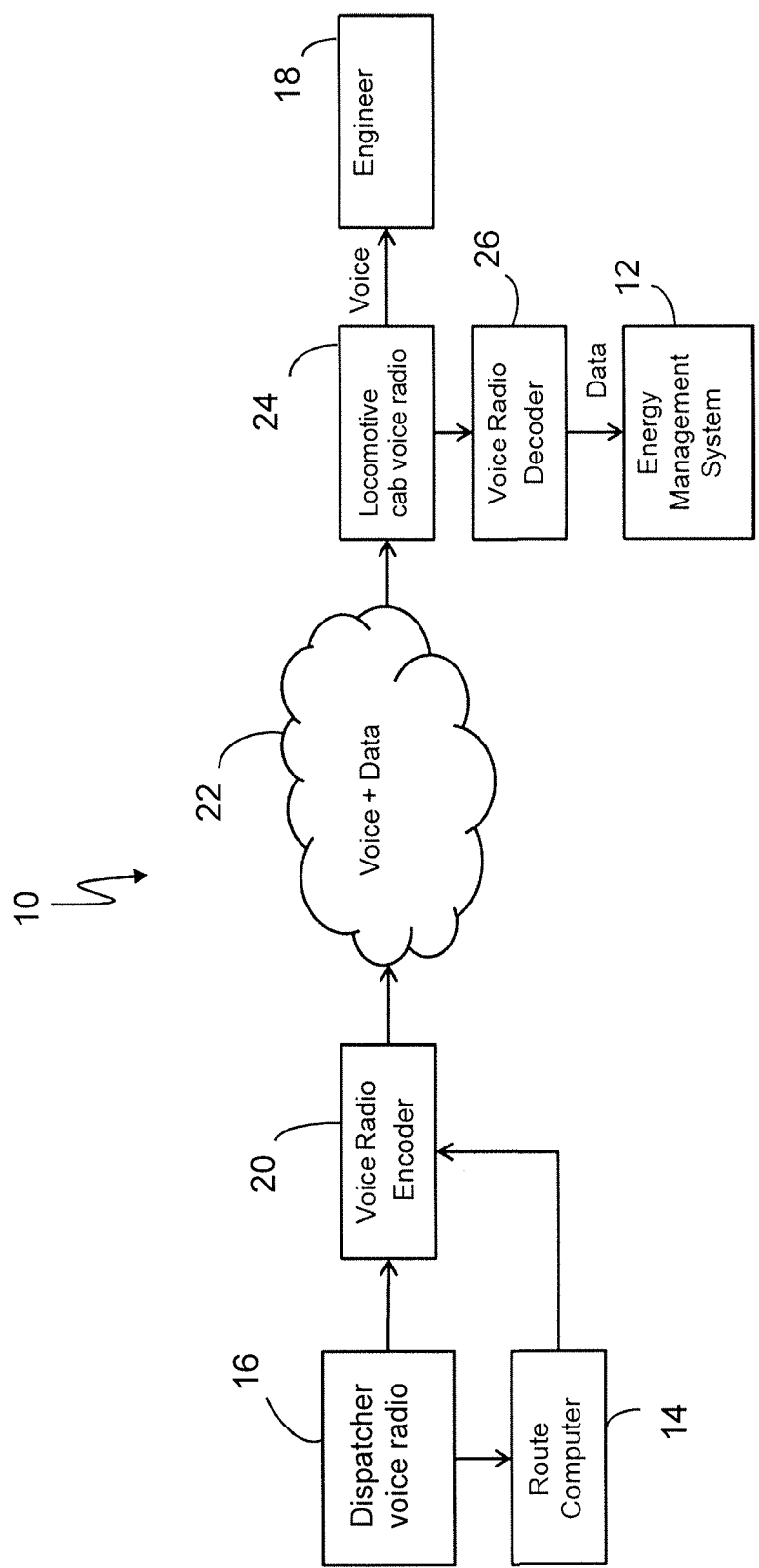

The present invention relates to locomotive instructional systems and, more particularly, to a system for providing temporary speed restrictions over locomotive cab voice radios.

2. Description of the Related Art

Energy or train management systems are computerized system used to control the operation of a train, to track events that occur during operation of the train, and to communication with central railroad systems. If an energy management system is in a disengaged mode, which may occur when an operator manually disengages the system while the train is parked, important information such as temporary speed restrictions cannot be electronically communicated to the system from a remote host. As a result, a dispatcher often has to place a call to the locomotive operator using a voice radio and then verbally relay the pertinent information. Unfortunately, operators will often forget to manually input the information into the energy management system. As a result, when the energy management system is engaged and used to operate the train, the operator display supported by the energy management may not display the correct information. For example, if an operator forgets to manually enter temporary speed restrictions provided by a dispatcher via voice radio, the operator will likely violate the temporary speed restrictions if he or she follows the unadjusted, permanent speed limits automatically displayed by the energy management system. Accordingly, there is a need for a system that can automatically provide temporary information, such as temporary speed restrictions, to a locomotive when the energy management system is disengaged, without the need to add additional antenna and related structures.

BRIEF SUMMARY OF THE INVENTION

The invention comprises a system for automatically updating route information to a locomotive. The system includes a route computer configured to output data representing at least one temporary change in a predetermined route. A voice radio encoder is coupled to the route computer for receiving the data representing at least one temporary change in the predetermined route and combining the data with an outgoing voice radio signal. A voice radio decoder is coupled to a locomotive cab voice radio for extracting the data representing the at least one temporary change in the predetermined route from the voice radio signal and providing the data representing the at least one temporary change in the predetermined route to a locomotive energy management system. The route computer is typically coupled to a dispatcher voice radio at the dispatch center, and the voice radio decoder is positioned in a cab of a locomotive in combination with a locomotive cab radio that is also positioned in the cab of the locomotive and is coupled to the voice radio decoder. The temporary change in the predetermined route will typically comprise a temporary speed restriction that would otherwise not be manually entered into the energy management system if the system is disengaged and the locomotive engineer forgets to manually enter the temporary changes.

BRIEF DESCRIPTION OF THE SEVERAL VIEWS OF THE DRAWING(S)

Figure 2:
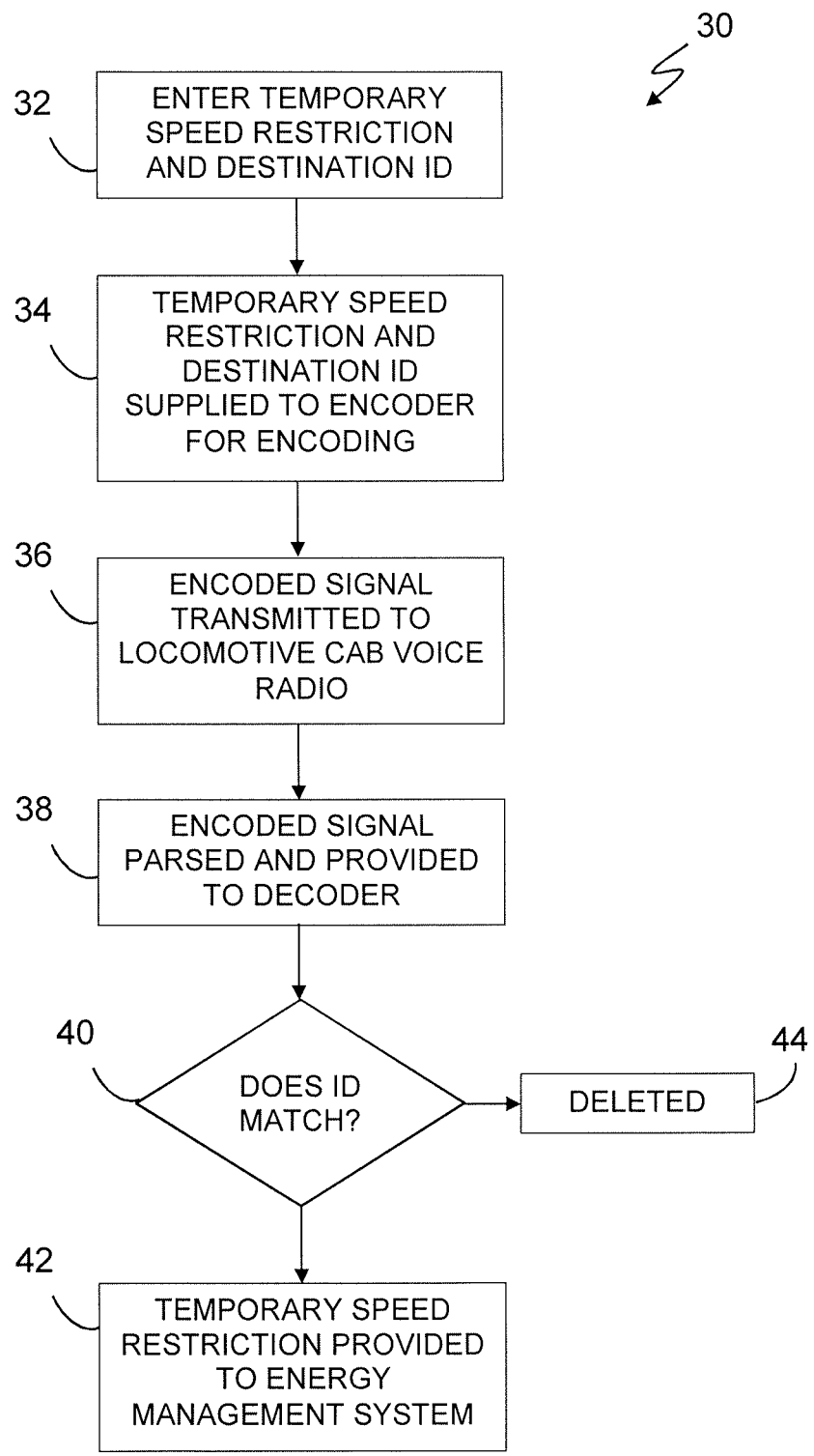

The present invention will be more fully understood and appreciated by reading the following Detailed Description in conjunction with the accompanying drawings, in which:

FIG. 1 is a schematic of a system for providing temporary speed restrictions to locomotives according to the present invention; and FIG. 2 is a flowchart of a method of providing temporary speed restrictions to locomotives according to the present invention.

DETAILED DESCRIPTION OF THE INVENTION

Referring now to the drawings, wherein like reference numerals refer to like parts throughout, there is seen in FIG. 1 a system 10 for automatically updating the energy management system 12 of a locomotive with variable route information, such as temporary speed restrictions, even when the energy management system 12 is disengaged. Energy management system 12 generally comprises a specialized computer system that manages all of the operations of a train, including one or locomotives in a consist. Energy management system 12 typically includes a locomotive operator interface and display that can provide a visual representation of the operation of the train to an engineer and also provide information about a specific route along which the train will travel. For example, energy management system 12 may display the distances to regular landmarks, such as mile posts, as well as route information, such a predetermined speed limits and other route specific information. It should be understood by those of skill in the art that energy management system 12 can provide any number of additional functions, such as real-time data collection, train dynamics analysis, even recording, etc.

System 10 includes a route computer 14 interconnected to a rail road back office dispatcher voice radio 16. Route computer 14 is generally pre-programmed with route specific information, including track data, point of interest locations, etc. In addition, route computer 14 may include data representing temporary changes in track data, such as temporary speed restrictions that have been put in place and that supersede the default track data for a route. When energy management system 12 is engaged, data regarding the particular route to be traveled by a train, including data representing temporary changes, may be provided electronically from route computer 14 to energy management system 12 via various electronic links include wayside radios. However, if energy management system 12 is disengaged, dispatcher radio 16 that is used to verbally relay temporary speed restrictions to a locomotive engineer 18 via the locomotive cab radio 24. When dispatcher 16 initiates communications with engineer 18 to provide an update on variations in the route, route computer 14 provides data representing the appropriate temporary speed restrictions to a voice radio encoder 20 that merges the temporary speed restriction data with the voice communication to provide a voice and data stream 22 to the cab radio 24 used by engineer 18. It should be recognized that does not need to be any meaningful voice communication in the connection, i.e., a radio call may be placed simply to allow for the transmission of data. A voice radio decoder 26 coupled to cab radio 24 extracts the temporary speed restriction data from the voice and data stream 22. Voice radio decoder 26 is also coupled to the energy management system 12 of the locomotive and provides the temporary speed restriction data directly to energy management system 12 without the need for manual entry, thereby avoiding the possibility that engineer 18 will forget to manually input the temporary speed restriction into energy management system 12 when energy management system 12 is reengaged.

Voice radio encoder 20 may comprise a module configured to implement a radio data system (RDS) or radio broadcast data system (RBDS) protocols. These protocols define similarly communication standards for coupling a subcarrier signal of about 57 kHz that transmits digital data to an FM signal (typically between 87.5 to 108.0 MHz) used to transmit analog radio data. The same approach may be used by voice radio encoder 20 to couple a subcarrier signal transmitting route information, such as temporary speed restrictions, to the voice radio call placed by a dispatcher 16 to cab radio 24. Voice calls are typically placed on an assigned railroad radio channel, such as one of the assigned AAR assigned frequency between 160.111 MHz to 161.565. The subcarrier signal for transmitting railroad data along with dispatcher voice calls may thus be selected based on the range of known radio channels in use for the particular geographic region or country. For example, in an AAR location, a subcarrier frequency in the MHz range may be selected so that minimizes interference between the data signal and the voice call. The transmitted message can be from 10 up to 100 or more bytes. Chipsets for use as voice radio encoder 20 and voice radio decoder 26 can be based on conventional RDS and RBDS protocol systems using conventional voice radio systems. Voice radio decoder 26 may be coupled to energy management system 12 using conventional train communication system data specifications, such as those used in Positive Train Control (PTC) systems and existing train communication networks, such as Ethernet/serial communication systems. Any concerns about security could be addressed by using a security protocol, such as the Class D protocol, or other standard security protocol.

Referring to FIG. 2, system 10 may be used to perform a method 30 of updating speed restrictions in energy management system 12. First, a dispatcher enters 32 a temporary speed restriction along with a destination ID into route computer 16 of system 10. The temporary speed restriction along and a destination ID are then supplied 34 to voice radio encoder 20 and encoded. The encoded signal is then transmitted 36 to locomotive cab voice radio 24, either alone or in addition to voice transmission, by voice radio encoder 20. Locomotive cab voice radio 24 parses the encoded signal from the transmission and provides the encoded signal 38 to voice radio decoder 26. A check 40 is then performed to determine whether the destination ID matches the voice radio decoder 26, thereby ensuring that the temporary speed restriction will be processed by the appropriate energy management system 12. If voice radio decoder 26 determines that destination ID matches the ID for the particular train or locomotive, the temporary speed restriction is retained and provided to energy management system 12 for updating of the appropriate speed restriction file 42. Otherwise, the temporary speed restriction is deleted 44.

What is claimed is:

1. A system for automatically updating route information to a locomotive, comprising:
   a route computer programmed with route specific information and configured to output data representing at least one temporary change in a predetermined route;
   a voice radio encoder coupled to the route computer for receiving the data representing at least one temporary change in the predetermined route and combining the data with an outgoing voice radio signal; and
   a voice radio decoder coupled to a locomotive cab voice radio for extracting the data representing the at least one temporary change in the predetermined route from the voice radio signal and providing the data representing the at least one temporary change in the predetermined route to a locomotive energy management system that also includes the predetermined route and route specific information.

2. The system of claim 1, wherein the route computer is coupled to a dispatcher voice radio.

3. The system of claim 2, wherein the voice radio decoder is positioned in a cab of a locomotive.

4. The system of claim 3, further comprising a locomotive cab radio positioned in the cab of the locomotive and coupled to the voice radio decoder.

5. The system of claim 4, wherein the at least one temporary change comprises a temporary speed restriction.

6. The system of claim 5, wherein the data representing at least one temporary change includes a destination ID specific to a particular locomotive.

7. A method of automatically updating route information to a locomotive, comprising:
   entering a temporary change in a predetermined route into a route computer programmed with route specific information;
   providing the temporary change to a voice radio encoder for encoding;
   transmitting the encoded temporary change to a locomotive cab radio as part of a voice communication from a dispatcher voice radio;
   extracting the encoded temporary change from the voice communication;
   providing the encoded temporary change to a voice radio decoder for decoding; and
   updating route specific information in an energy management system that also includes the predetermined route and route specific information based on the decoded temporary change.

8. The method of claim 7, wherein the route computer is coupled to the dispatcher voice radio.

9. The method of claim 8, wherein the voice radio decoder is positioned in a cab of a locomotive.

10. The method of claim 9, wherein a locomotive cab radio is positioned in the cab of the locomotive and coupled to the voice radio decoder.

11. The method of claim 10, wherein the temporary change comprises a temporary speed restriction.

12. The method of claim 11, wherein the temporary change includes a destination ID specific to a particular locomotive.

13. The method of claim 12, wherein the destination ID is checked to determine whether the destination ID matches the energy management system prior to updating the energy management system based on the decoded temporary change.

* * * * *